(12) United States Patent
Nunamaker (10) Patent No.: US 9,966,868 B2
(45) Date of Patent: May 8, 2018

(54) THREE-PHASE TO NINE-PHASE AUTOTRANSFORMER

(71) Applicant: NORLAKE MANUFACTURING COMPANY, North Ridgeville, OH (US)

(72) Inventor: James Patrick Nunamaker, Litchfield, OH (US)

(73) Assignee: NORLAKE MANUFACTURING COMPANY, North Ridgeville, OH (US)

( * ) Notice: Subject to any disclaimer, the term of this patent is extended or adjusted under 35 U.S.C. 154(b) by 0 days. days.

(21) Appl. No.: 15/591,281

(22) Filed: May 10, 2017

(65) Prior Publication Data

US 2017/0331388 A1 Nov. 16, 2017

Related U.S. Application Data

(60) Provisional application No. 62/336,037, filed on May 13, 2016, provisional application No. 62/344,092, filed on Jun. 1, 2016.

(51) Int. Cl.
| | |
|---|---|
| *H01F 30/14* | (2006.01) |
| *H02M 5/14* | (2006.01) |
| *H02M 7/06* | (2006.01) |
| *H02M 1/12* | (2006.01) |
| *H01F 27/28* | (2006.01) |
| *H02M 1/14* | (2006.01) |
| *H01F 30/12* | (2006.01) |

(52) U.S. Cl.
CPC .............. *H02M 5/14* (2013.01); *H01F 27/28* (2013.01); *H02M 1/12* (2013.01); *H02M 7/06* (2013.01); *H01F 30/12* (2013.01); *H01F 30/14* (2013.01); *H02M 1/14* (2013.01)

(58) Field of Classification Search
CPC .......... H01F 30/02; H01F 30/12; H01F 30/14; H01F 27/28; H02M 5/14; H02M 1/12
See application file for complete search history.

(56) References Cited

U.S. PATENT DOCUMENTS

| | | | | |
|---|---|---|---|---|
| 5,619,407 A | * | 4/1997 | Hammond | H01F 30/02 363/148 |
| 6,249,443 B1 | * | 6/2001 | Zhou | H01F 30/14 363/155 |
| 6,335,872 B1 | * | 1/2002 | Zhou | H02M 5/14 363/148 |
| 6,525,951 B1 | * | 2/2003 | Paice | H01F 30/14 363/153 |

(Continued)

*Primary Examiner* — Jue Zhang
*Assistant Examiner* — Jye-June Lee
(74) *Attorney, Agent, or Firm* — Fay Sharpe LLP (57) ABSTRACT

An autotransformer for converting three-phase AC power to nine-phase AC power. The autotransformer includes three coils each having serial connected windings and non-serial connected windings. The combination of the serial and non-serial windings are interconnected to form a polygon for a total of six windings per phase, in an arrangement which reduces the power rating of an autotransformer suitable for 18-pulse AC to DC power converters. There are a plurality of direct outputs that are equal in magnitude and are out of phase with respect to the voltages at the input. The input is offset from the nine outputs to create the required phase magnitudes for DC power converters.

18 Claims, 9 Drawing Sheets

(56) References Cited

U.S. PATENT DOCUMENTS

| | | | |
|---|---|---|---|
| 7,274,280 B1 * | 9/2007 | Paice | H01F 30/14 336/148 |
| 7,750,782 B1 * | 7/2010 | Paice | H02M 5/14 336/12 |
| 2010/0176755 A1 * | 7/2010 | Hoadley | H02M 5/14 318/105 |

* cited by examiner

THREE-PHASE TO NINE-PHASE AUTOTRANSFORMER

CROSS-REFERENCE TO PRIOR RELATED APPLICATIONS

This application claims the benefit of U.S. Provisional Application No. 62/336,037 filed May 13, 2016 and U.S. Provisional Application No. 62/344,092 filed Jun. 1, 2016, both of which are incorporated by reference herein in their entirety.

BACKGROUND

The present application is directed to electrical power converters, and more particularly to three-phase input to nine-phase output power converters. A variety of electrical power converters have been described in the existing art.

Figure 1:
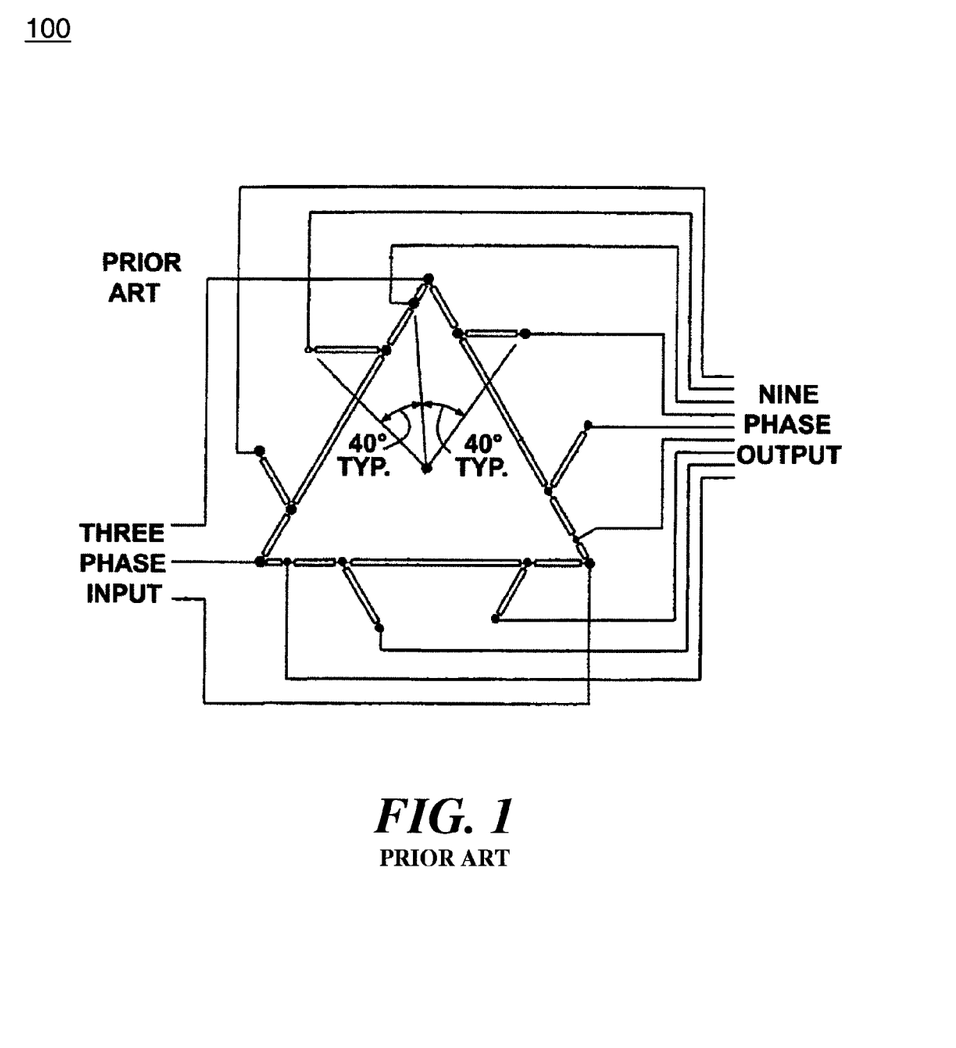
FIG. 1 illustrates an autotransformer design according to U.S. Pat. No. 5,619,407.
Figure 2:
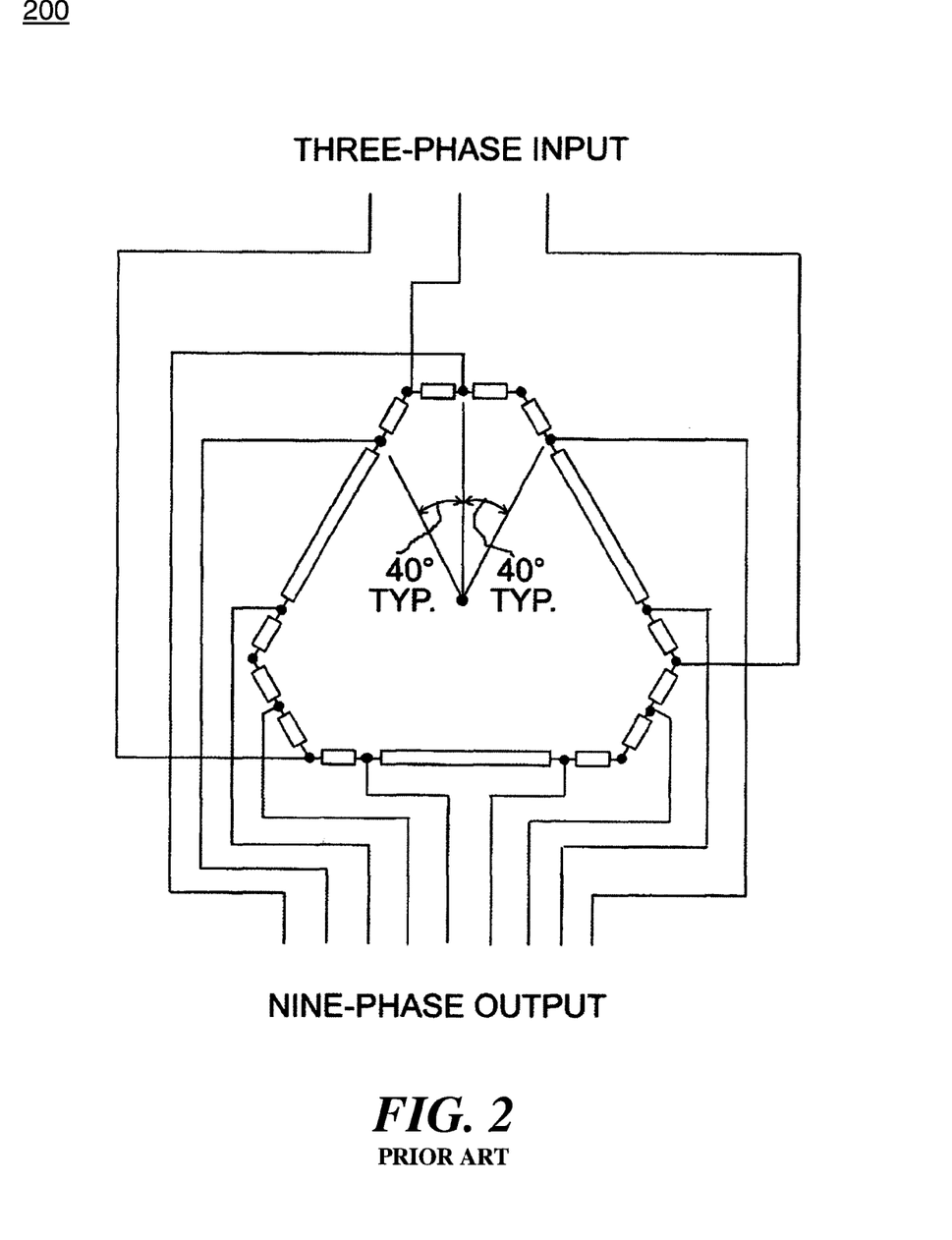
FIG. 2 illustrates an autotransformer design according to U.S. Pat. No. 6,335,872.
Figure 3:
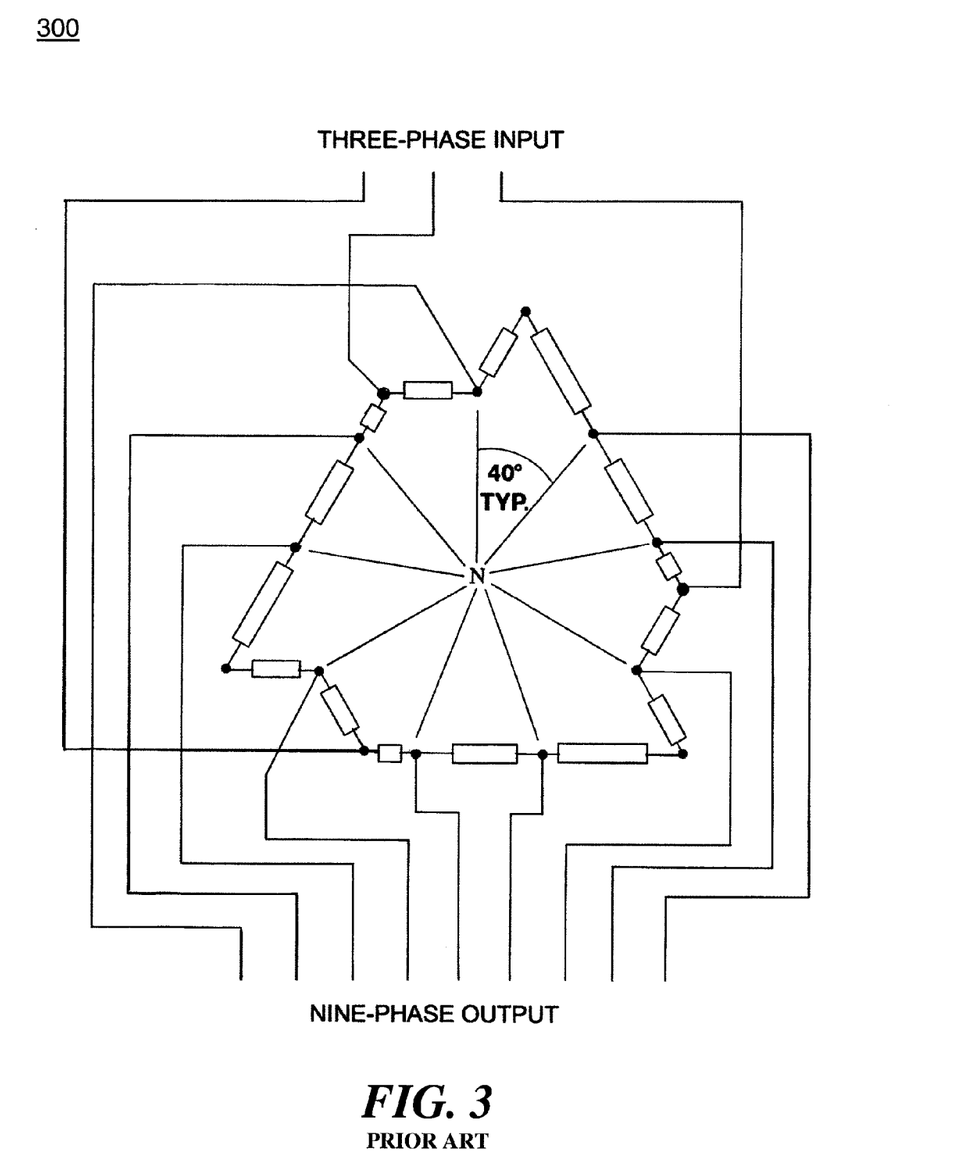
FIG. 3 illustrates an autotransformer design according to U.S. Pat. No. 7,274,280.

For example, FIGS. 1-3 illustrate various power converter topologies where three-phase power is converted to nine-phase power.

More particularly FIG. 1 illustrates a three-phase input to nine-phase output according to U.S. Pat. No. 5,619,407, which employs a delta connection 100. The nine output voltage vectors have 40° separation from each other. Also depicted in this figure are six non-symmetrical stub type windings which assist in obtaining a desired step down of the voltage. The three-phase power supply is applied at the delta's apexes.

Turning to FIG. 2 a polygon transformer of U.S. Pat. No. 6,335,872 is illustrated 200. This topology employs five windings for each phase. This topology, however, generates undesirable circulating third harmonic current which results in an undesirable increase in the transformer kVA rating. The topology is used for loads which do not require third harmonic currents, and is not considered sufficient for loads presented by a nine-phase AC to DC bridge converter.

Next, U.S. Pat. No. 7,274,280 illustrated in FIG. 3 uses an arrangement of five windings for each phase 300. In this patent the polygon connections are configured so as to reduce the circulating third harmonic current.

In view of the forgoing it is considered useful to provide a new design that provides improvements to the existing topologies, methods and systems.

BRIEF DESCRIPTION

The present application relates to power converters, which can be used for AC and/or DC motor drive systems among other implementations. The three-phase, polygon connected autotransformer of the present disclosure, uses turn ratios and winding interconnections appropriate for a particular implementation to produce a nominally balanced nine-phase set of output voltages. The disclosed design employs six windings on each coil and phase of the autotransformer.

The present autotransformer topology can also be used as the secondary winding configuration of a double-wound isolation transformer.

DETAILED DESCRIPTION

Figure 4:
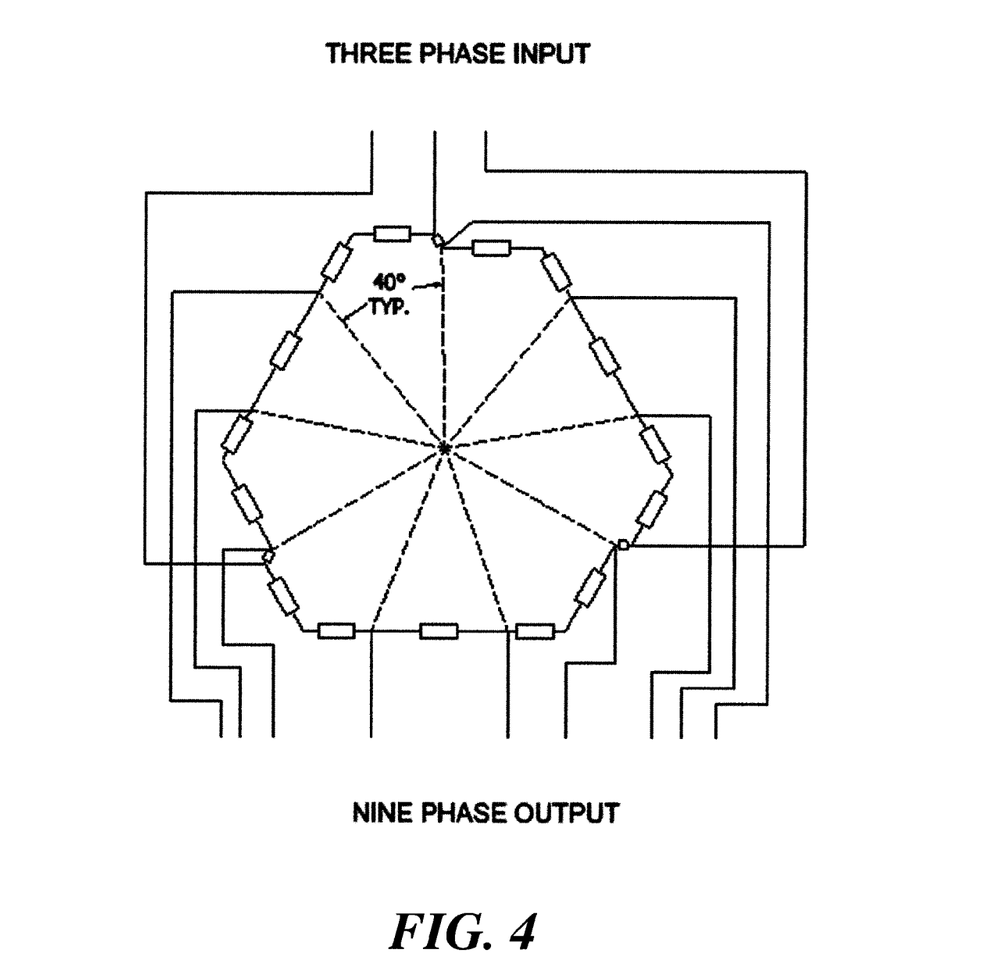
FIG. 4 illustrates an autotransformer design for an embodiment according to the present application.

Having discussed existing transformer designs such as those of FIGS. 1-3, attention is now directed to FIG. 4 which illustrates an autotransformer topology according to the present disclosure 400. In FIG. 4 transformer windings are represented by rectangular boxes and nodes (e.g., input and output terminals) by large filled in black dots. The topology enables the amplitude of third harmonic circulating current to be controlled, and reduces the transformer rating to be less than 20% of the DC load rating. The topology employs winding ratios and interconnections such that a nine-phase output is obtained by identifying six windings for each coil. The windings being interconnected in a manner such that in operation there are six coils associated with each phase of the three phase input, from a three phase power supply or source. The six windings of each phase not corresponding directly to the six windings associated with each particularly identified coil. The association of windings to a phase being determined by the particular winding interconnections which are made.

The shape of the topology is that of a multi-sided polygon. Nominally equal amplitude voltages separated by typically 40° are obtained on the output connections of a nine phase output. The output voltage amplitudes have a range of approximately 10-13% and more particularly approximately 11% less than that of the three phase power source (which is an amount suitable for 480V power converter systems, among other uses). The windings carry both load and circulating third harmonic currents. The net result of the autotransformer configured in this manner is an efficient, three-phase to nine-phase autotransformer which provides an efficient use of conductive material used for the windings, such as but not limited to copper or aluminum.

Figure 5:
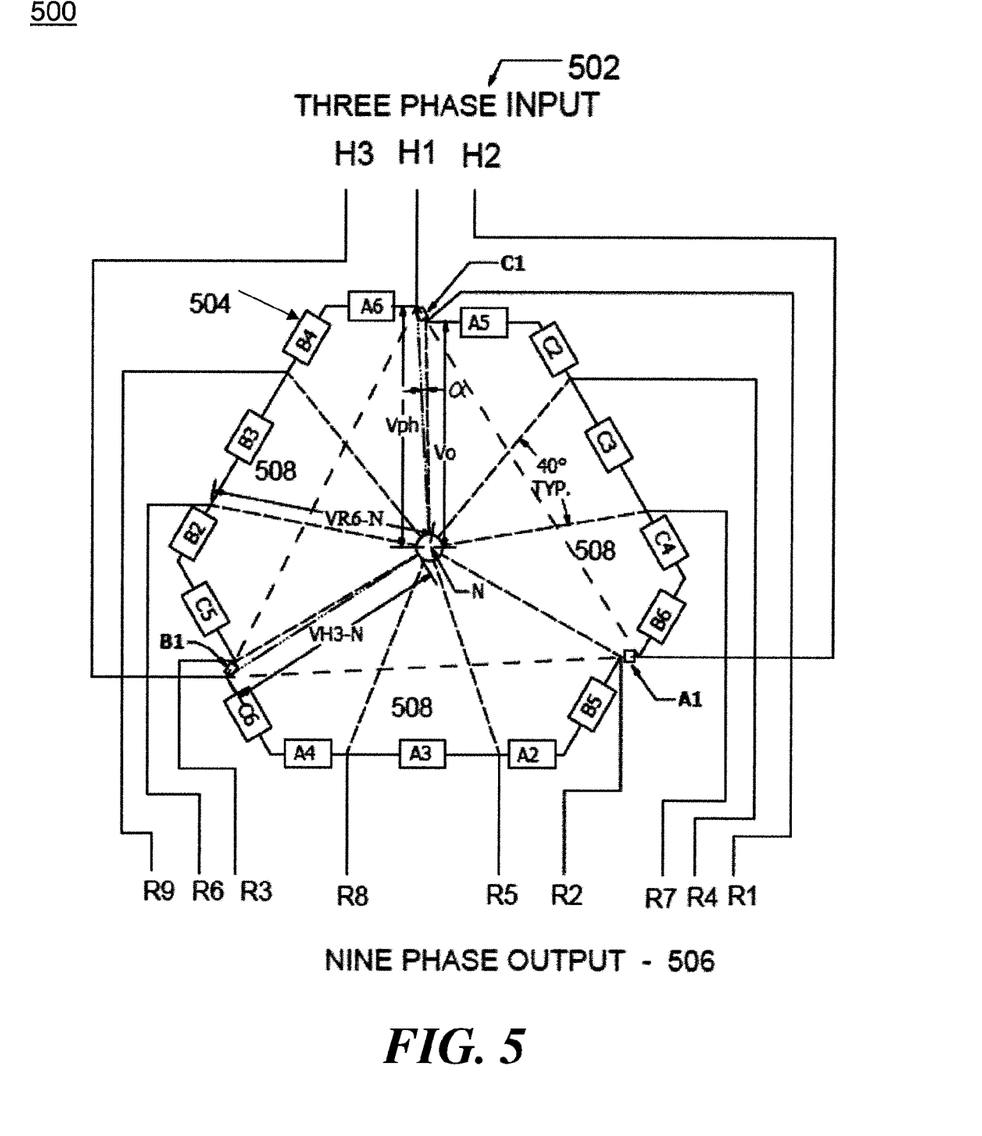
FIG. 5 illustrates a more detailed view of the design of the autotransformer of the present concepts with labels to facilitate detailed discussion.

FIG. 5 illustrates an autotransformer topology 500, such as that of FIG. 4, with additional details including labels to facilitate discussion. A three phase power supply or source applies a three-phase input voltage 502 via input nodes (or terminals) H1, H2, and H3 to a polygon winding arrangement 504. Nine output nodes or terminals R1-R9 are provided for obtaining of a nine phase voltage output 506.

A virtual neutral point N provides a reference point to define the input voltages. For example, the voltage between H3 and N defines an input line to neutral voltage represented by a phantom line labeled VH3-N. This is one of three input line to neutral voltages, the other such voltages being designated VH1-N and VH2-N (not included in the drawing). Such input voltages are generally identified herein by the designation: Vph.

The virtual neutral point N is also used as a reference point to define nine-phase voltage outputs at nodes or terminals R1-R9. For example, the voltage from node R6 to N is represented by the phantom line labeled, VR6-N. The nine output voltages are therefore available at nodes R1 through R9, again, represented by lines starting from the virtual neutral node N and pointing toward a particular one of nodes R1-R9. These output voltages are nominally of the same amplitude and typically are displaced in sequence by approximately 40°. Such output voltages are generally identified herein by the designation: Vo.

The polygon winding arrangement 504 is organized to include a first coil, a second coil, and a third coil. Windings of each coil are, as previously mentioned, depicted in the form of rectangles. The first coil is understood to include six windings labeled A1, A2, A3, A4, A5 and A6, the second coil is understood to include six windings labeled B1, B2, B3, B4, B5 and B6, and the third coil is understood to include six windings labeled C1, C2, C3, C4, C5 and C6. It is mentioned the designations for windings A1, B1, C1 are not within the associated rectangular box due to size considerations, and are pointed to by arrowhead lines.

Windings with the same number label, e.g., windings A1, B1, and C1 have the same number of turns; windings A2, B2, C2, have the same number of turns; A3. B3, C3 have the same number of turns, and so on for all windings of the topology 500 of FIG. 5. For convenience these groupings are often referred for example as A1, B1, C1 turns; A2, B2, C2 turns, A3, B3, C3 turns, and so on.

The autotransformer topology 500 of FIG. 5 includes the relative number of turns (or turns ratio) on each winding, where specific numbers are determined and selected for particular implementations. Interconnections between these windings are then made to form the polygon arrangement 504. The connections between the individual windings result in serially connected windings and non-serially connected winding (or also called isolated winding; the use of the term "isolated" herein is not the same use of isolated as in FIG. 7). The serial connections are those connection between windings identified as being part of the same coil (e.g., A2, A3 and A4, and so on). The non-serial winding connections are inter-phase (or cross-phase) connections, which are understood to mean that windings from different coils are connected to each other. As examples, but not limited thereto, winding C1 is inter-phase connected to winding A6; winding A1 is inter-phase connected to B6, winding A5 is inter-phased connected to C2, and so on.

Formation of the polygon arrangement 504 using the inter-phase (or cross-phase) connections taught herein reduces circulating third harmonic currents caused by a nonlinear load, such as a nine-phase bridge converter to a value that has tolerable effect on the windings current rating per IEEE 519 harmonic mitigation requirements.

Figure 6:
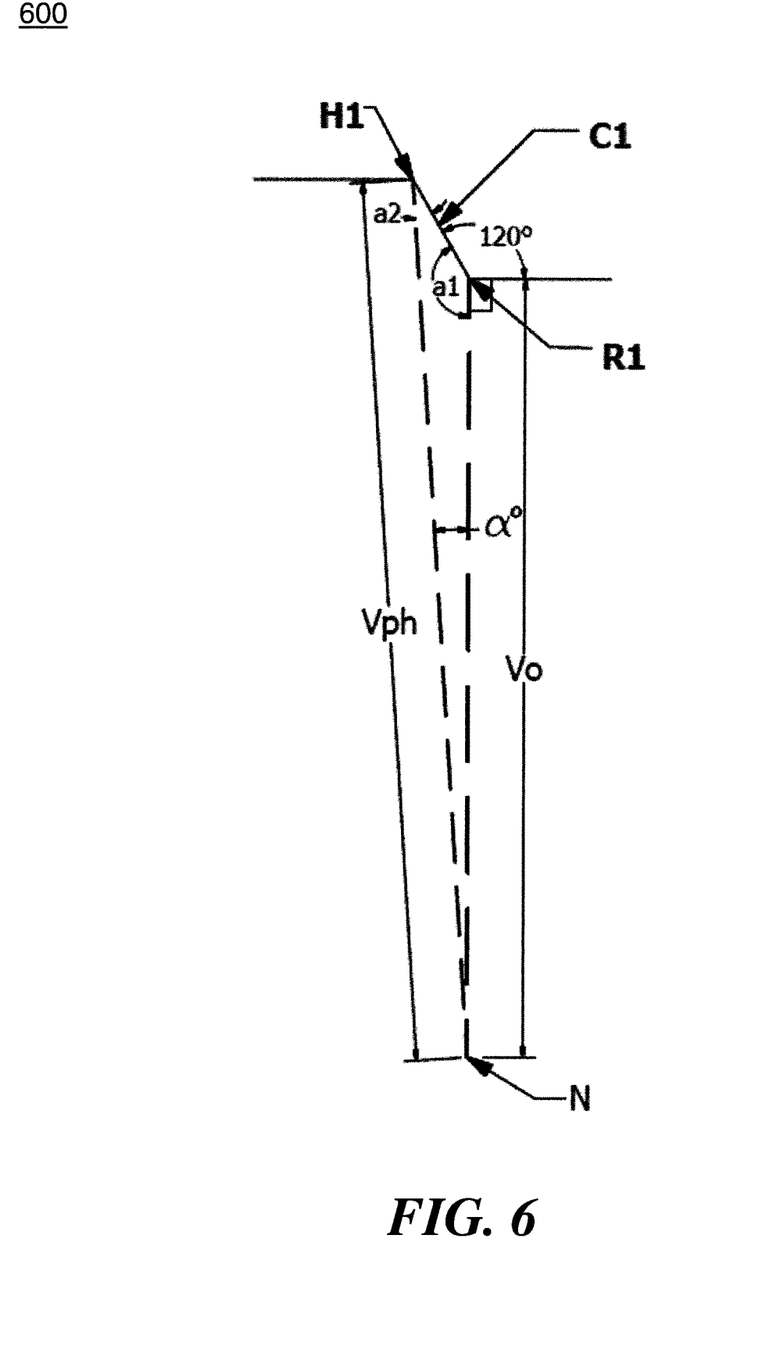
FIG. 6 illustrates a slew angle required to determine the phase angles and winding voltages required for desired phase shifting.

The transformer rating is further optimized by the suitable selection of winding designs. In this regard the following discusses procedures for selection of suitable designs for windings (for this discussion C1, A6 are used), and slew angle α as shown in FIG. 5 and in more detail in FIG. 6. Where FIG. 6 illustrates the angles and the geometry used to calculate the slew angle 600. It is to be understood the descriptions of FIGS. 5 and 6 are applicable to the other windings of the present autotransformer topology.

In review, referring to FIG. 5 a three phase power supply 502 is connected to terminals H1, H2, and H3. Further a virtual neutral point defined as node N is a reference point for describing voltage vectors for the presently disclosed autotransformer 500.

FIG. 6 details out the slew angle required to create the phase angles and winding voltages for proper phase shifting for the autotransformer 500 of FIG. 5. Particularly, the slew angle is determined based on the input voltage (Vph) and the output voltage (Vo). From this determination, the voltage across winding C1 is calculated using trigonometry as would be known by one of skill in the art. It is appreciated that similar calculations can be employed to find the appropriate voltages for windings A1 and B1.

FIG. 6 also illustrates the input voltage (Vph) associated with one of the phases of the three phase power supply which is represented by the dashed line drawn from the neutral point N toward (i.e., between) nodes C1 and A6 of FIG. 5 (e.g., for the voltage on H1). Each of the three input voltages for the three phase input are respectively represented by H1, H2 and H3 and the virtual neutral node N. Thus while FIG. 6 provides an illustration for an A phase (e.g., from H1) only, the same concepts are applicable for a B phase (e.g., from H2; between A1 and B6), and a C phase (e.g., from H3; between B1 and C6), as can be seen at the points of the lines of triangle 508.

Vph is defined as the amplitude of the three phase line to line voltage (Vll) divided by square root of 3. If the three phase input is 480V line to line, then Vph is defined as Vll/√3 or 480/√3 equals 277 V.

As recalled, output voltage vectors are indicated by the dashed pointing from the virtual neutral N toward the appropriate respective output node (e.g., output terminals R1-R9). For this conversation it is convenient to assume an output voltage of unity and make the output voltage vector pointing to node R1 the reference vector. Thus, the output voltage vector at node R1 is defined as:

$$VR1\text{-}N = R1 \angle 0°,$$

(e.g., shown as Vo in FIG. 6).

Respective output voltages according to this definition are available at nodes/terminals labeled R1 through R9, and have successive phase shifts of typically 40°. For example, the voltage at terminal R2 is defined as VR2–N=R2∠40°, the voltage at terminal R3 is defined as VR3–N=R3∠80°, the voltage at terminal R4 is defined as VR4–N=R4∠120°, and so on. The output terminal designations (R1-R9) are used to represent the voltage magnitude, and the value of the angle represents the amount of phase shift. Thereafter, vector algebra or other appropriate procedures are used to determine the relative value of windings in the polygon connection arrangement.

Thus FIG. 6 illustrates that windings in this example C1, A6 (for phase A from input terminal H1) and slew angle (α) are being used as design variables for the present topology. It is noted that by selecting one of these variables, for example C1, the other two (e.g., A6 and the slew angle) are effectively defined. Thus defining C1 as the design variable, winding A6 and slew angle α, are found in the following manner.

The slew angle α is defined by the input voltage Vph identified above, and the output voltage Vo, defined as the desired DC output voltage. In one situation this output voltage is approximately 600 to 610 Vdc based on industry standards for drive type applications.

FIG. 6 shows the relationship of the slew angle α, and the input voltage Vph and the output Voltage Vo. Using the law of Sines, the angles for a1 and a2 are calculated. Once a1 and a2 are calculated, the slew angle α is calculated. Equation 1 shows the equation used to solve for the slew angle in simplified form:

$$a1 = 150° \ (360° - 120° - 90°)$$

$$a2 = a\sin[(\sin(a1) * Vo/Vph]$$

$$\alpha = 180° - a1 - a2 \ \text{(Law of triangles)} \quad (1)$$

As noted previously, windings with a different letter but the same number have the same fractional value (e.g., number of turns). Thus, for example, B3 has the same numerical value as A3 and C3, and C6 has the same numerical value as A6 and B6.

A similar analysis method can be used to determine the remaining polygon parameters. For example, with continuing reference to FIG. 6, and using the Law of Sines the voltage between nodes H1 and R1 is calculated (C1):

$$C1 = \sin(\alpha) * Vph/\sin(150°) \ \text{(Volts)} \quad (2)$$

The polygon of FIG. 5 can be solved using Equations (1) and (2) and performing the vector and trigonometry calculations the winding voltages can be solved for each. For example, with Vph of 277V and Vo of 241 the following values are found to be:

Solving for α:

$$a1 = 150°$$

$$a2 = a\sin[(\sin(150°) * 241/277] \ a2 = 26.3°$$

$$a = 180° - 150° - 26.3° \ \alpha = 3.7°$$

The remaining voltage magnitudes of the remaining windings can be solved with the same methods. Table One shows the voltage calculations for the windings of this design.

TABLE ONE

| Winding | Value | Units |
| --- | --- | --- |
| C1 = | 39.006 | Volts |
| C2 = | 65.245 | Volts |
| C3 = | 165.389 | Volts |
| C4 = | 105.846 | Volts |
| C5 = | 122.772 | Volts |
| C6 = | 44.403 | Volts |

Solving Equation (2) gives the voltage amplitude for winding C1 as a function of the slew angle and the defined input/output requirements.

Windings such as A3, A2, A4, A5 and A6 and so on, are found using vector algebra and/or trigonometry in a similar manner.

Since the different phases will normally have the same or matching numerical values, in some embodiments it is convenient to tabulate the results with respect to one arbitrarily selected phase and then replicate the same for the other two phases.

Therefore, from the foregoing FIG. 6 illustrates an exemplary voltage phasor diagram showing the relationships of the input and output voltages that are used to define the slew angle and the subsequent voltage on a particular node (i.e., winding C1). Once this voltage is defined from the relevant input voltage and output voltage, the remaining node (i.e., windings) voltages can be calculated as shown in Table One.

Figure 7:
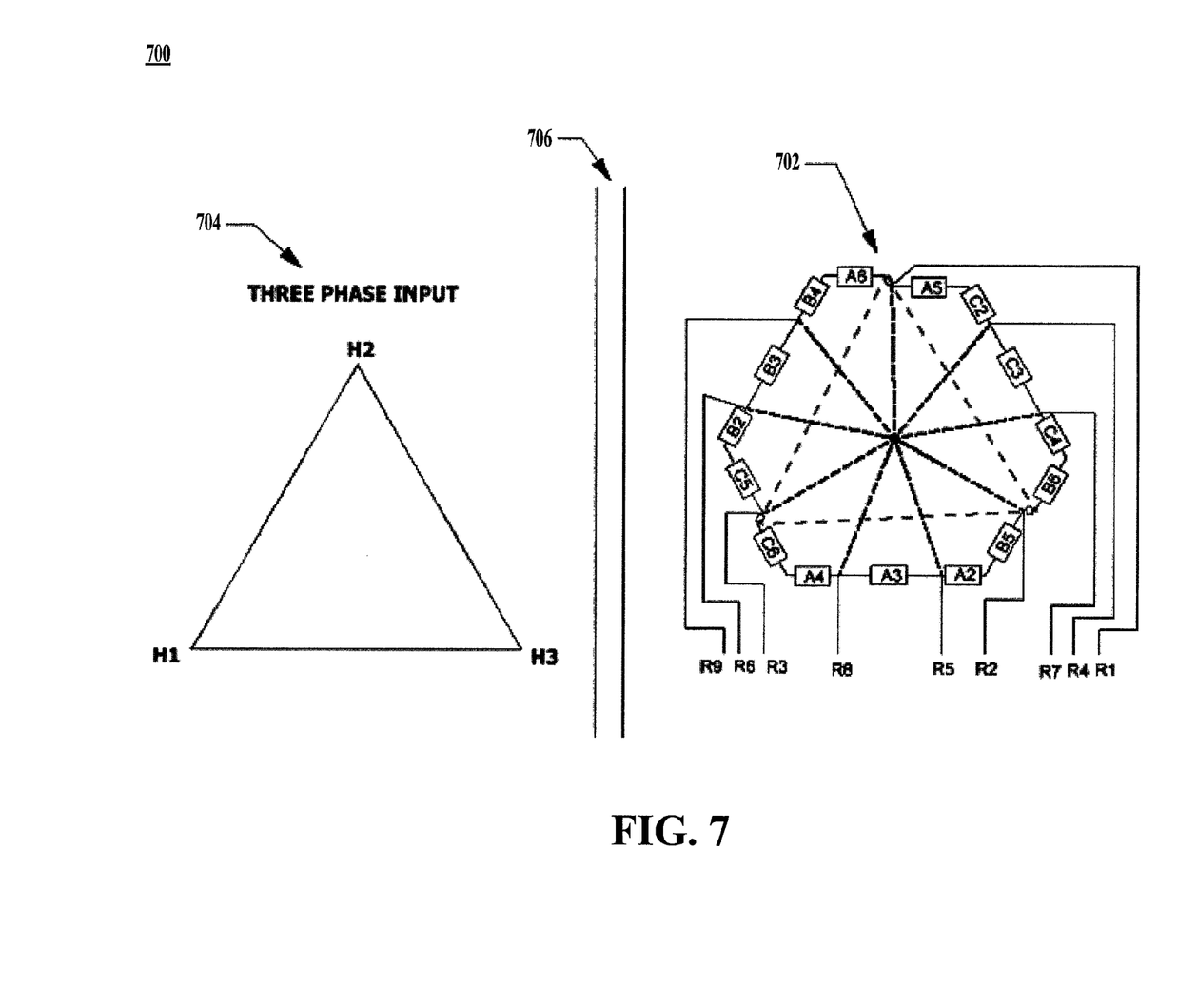
FIG. 7 illustrates a double wound transformer arrangement with a delta three phase primary winding, and where the autotransformer winding arrangement of FIG. 5 is used as a secondary

Turning to FIG. 7 illustrated is a double wound transformer 700, which includes polygon windings 702 (arranged and connected according to FIG. 5) with additional isolated winding arrangement 704 respectively on each coil (e.g., the first, second and third coils), and an isolation designator (which may in certain embodiments represent a core) 706. The forgoing components being arranged such that three phase AC input power applied through isolated winding 704 converts the polygon arrangement 702 from an autotransformer to double-wound transformer 700.

FIG. 7 shows the isolated winding 704 in a delta arrangement. It is appreciated that other winding arrangements may be used including but not limited to a wye, zig-zag, extended delta, or polygon arrangement. The autotransformer of the present application has an equivalent double-wound KVA rating that is less than the load KW.

Figure 8:
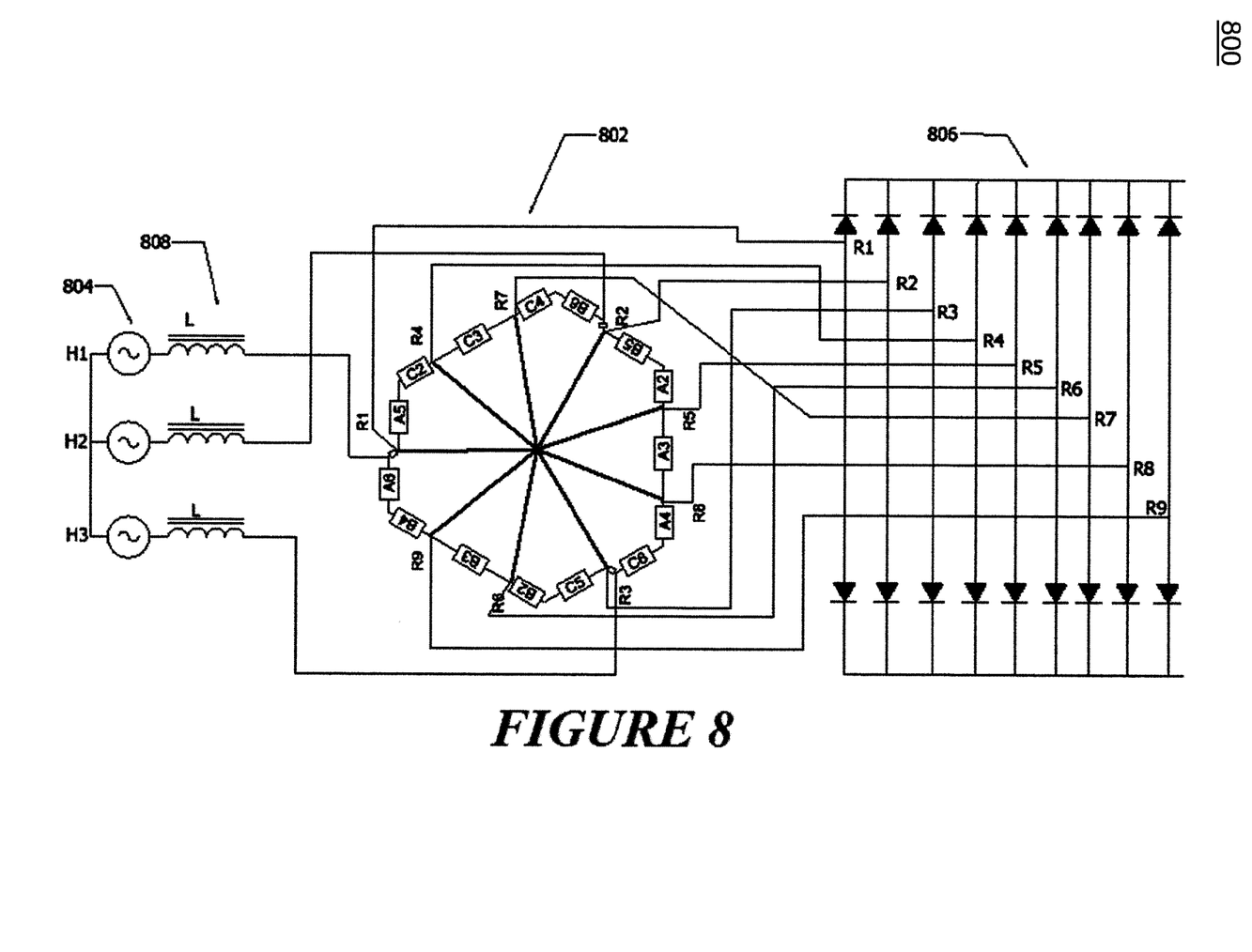
FIG. 8 illustrates an autotransformer according to the present teachings with a three phase input with serial inductance, and a nine phase, 18 pulse output; and, FIG. 9 is a chart of time versus volts with waveforms for various measurements.

Turning to FIG. 8 illustrated is a system 800 which includes the polygon designed autotransformer 802 (such as illustrated in FIG. 5), being supplied power via a three phase power supply 804, and which supplies output voltages to a nine phase rectifier 806 to produce an 18 pulse AC to DC converter output. The three phase power supply 804, in certain embodiments applies the phased voltages to nodes or terminals H1, H2, H3 though in-line series inductor L1 808, wherein the inductance is a three phase inductor. The inductor is used to further attenuate high frequency harmonic currents that may be associated with a multi-pulse AC-DC converter. In certain embodiments the series reactance L1 808 is included as part of the three-phase AC input power source 804. Further the power supply and/or inductor arrangement of this figure is also used in certain embodiments in the arrangements of FIGS. 5 and 7.

Autotransformer 802 connected to the nine-phase rectifier 806 produces an 18-pulse converter output having a low output voltage ripple on the DC voltage and with low harmonic distortion of the AC input harmonic current. It is noted the rectifier 806 is in certain embodiments a silicon controlled rectifier (SCR) controller or other device used to produce DC power at variable speeds or frequency and set-ups. Specific arrangements being dependent upon an end user's implementations. There is a plurality of direct (DC) outputs that are equal in magnitude and are out of phase with respect to the voltages at the input. The input is offset from the nine outputs to create the required phase magnitudes for DC power converters.

Figure 9:
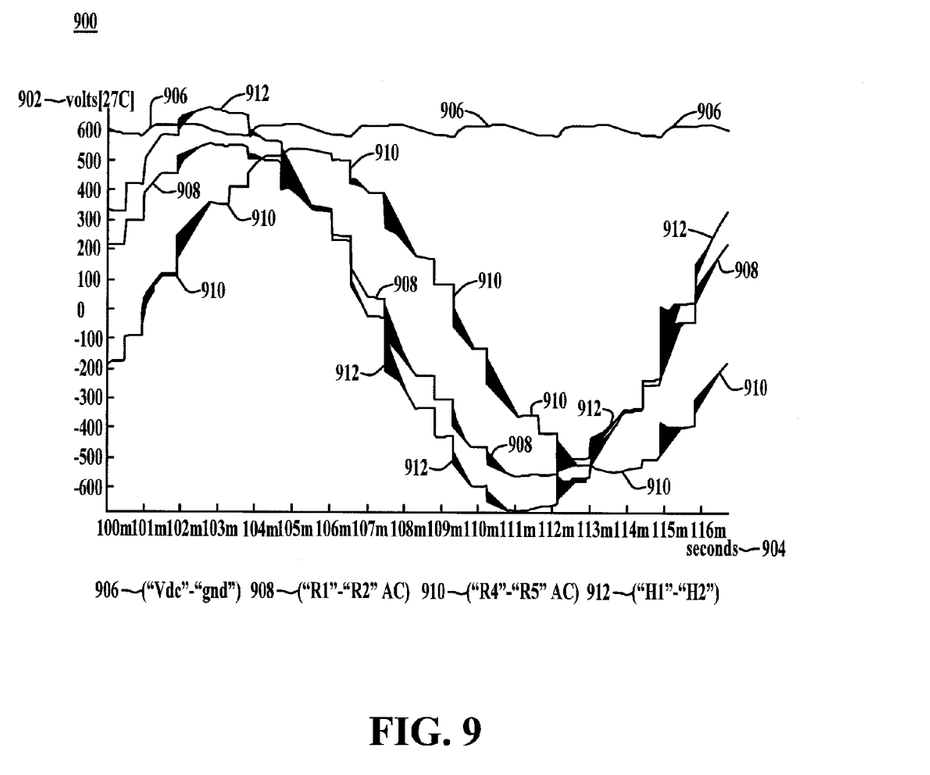

Turning now to FIG. 9, illustrated is a graph 900 of voltage 902 versus time (milliseconds) 904, which shows potential outputs of an arrangement using the topology of FIG. 5, within the circuit shown in FIG. 8, where there is a nominal approximate input voltage of 480V and a nominal approximate output voltage of 600 to 610 Vdc. The signals described are for DC output voltage to ground (gnd) 906, the AC voltage across terminal R1 and terminal R2 908, the AC voltage across terminal R4 and terminal R5 910, and the AC voltage across terminal H1 and terminal H2 912.

Based on the forgoing disclosure, certain distinctive aspects of the present application are shown to include the description of an autotransformer for converting three-phase AC power to nine phase AC power. The structure of the autotransformer has been described to include a first coil having windings A1-A6, a second coil having windings B1-B6, and a third coil having windings C1-C6. Each of the first, second and third coils have serial windings and non-serial windings. The first coil (windings A1-A6) includes serial windings A2, A3, A4 and non-serial windings A1, A5, A6; the second coil (windings B1-B6) includes serial windings B2, B3, B4 and non-serial windings B1, B5, B6, and the third coil (windings C1-C6) includes serial windings C2, C3, C4 and non-serial windings including C1, C5, C6.

The serial windings and non-serial windings of each of the coils being magnetically coupled to each other.

The serial and non-serial windings on the first coil, the second coil, and the third coil containing a start end and a finish end such that current entering the start end produces a magnetic flux in one direction whereas a current entering the finish end produces a magnetic flux in the opposite direction. The serial windings being connected with to each other with a start end connected to finish end of the next winding of the series.

In more detail the interconnections of the windings (e.g., for Phase A operation) includes having a finish end of a serial winding C2 of the third coil C1-C6 being connected to a finish end of a non-serial winding A5 of the first coil A1-A6, a start end of the non-serial winding A5 of the first coil A1-A6 being connected to a start end of a non-serial winding C1 of the third coil C1-C6, a finish end of the non-serial winding C1 of the third coil C1-C6 being connected to a finish end of a non-serial winding A6 of the first coil A1-A6, a start end of the non-serial winding A6 of the first coil A1-A6 being connected to a start of a series of winding B4, B3, B2 on the second coil B1-B6.

Further interconnections of the windings (e.g., for Phase B operation) include having a finish end of a serial winding A2 of the first coil A1-A6 being connected to a finish end of a non-serial winding B5 of the second coil B1-B6, a start end of the non-serial winding B5 of the second coil B1-B6 being connected to a start end of a non-serial winding A1 of the first coil A1-A6, a finish end of non-serial winding A1 of the first coil A1-A6 being connected to a finish end of a non-serial winding B6 of the second coil B1-B6, a start end of the non-serial winding B6 of the second coil B1-B6 being connected to a start end of a series windings C4, C3, C2 on the third coil C1-C6.

Still additional description of the interconnections of the windings (e.g., for Phase C operation) further includes having a finish end of a serial winding B2 of the second coil B1-B6 being connected to a finish end of a non-serial winding C5 of the third coil C1-C6, a start end of the non-serial winding C5 of the third coil C1-C6 being connected to a start end of a non-serial winding B1 of the second coil B1-B6, a finish end of non-serial winding B1 of the second coil B1-B6 being connected to a finish end of a non-serial winding C6 of the third coil C1-C6, a start end of the non-serial winding C6 of the third coil C1-C6 being connected to a start end of a series windings A4, A3, A3 on the first coil A1-A6.

The above teaches that the described interconnections are repeated sequentially for the first coil, the second coil, and the third coil until the windings are interconnected, to form the multi-sided polygon 504 of FIG. 5, wherein symmetrically disposed nodes (e.g., in one example A1, B1, C1) of the polygon winding provides points for applying three-phase AC input voltage (via H1, H2, H3) and extraction of AC output voltages of predetermined amplitude and phase (e.g., via extraction points R1-R9).

The autotransformer of the present application also includes the input voltage being a three-phase AC supply and the output being a nine-phase AC supply with voltages nominally equal in amplitude and typically spaced by 40°.

The autotransformer of the present application is also configured to include an additional isolated winding arrangement (identified in FIG. 7), such that three phase AC input power is applied through the isolated winding arrangement to convert the autotransformer to a double-wound transformer. The isolated winding arrangement of FIG. 7 is configured as a delta input. However, it is understood that other arrangements may be used including but not limited to a wye, zig-zag, extended delta, or polygon arrangement.

The autotransformer of the present application also includes having the specific amplitude AC output voltages being less than, greater than or equal to that of the three-phase AC input power supply.

The autotransformer of the present application further includes having a nine-phase output connected to a nine-phase input rectifier so as to produce an 18-pulse converter with low output voltage ripple on the DC voltage and with low harmonic distortion of the AC input harmonic current. It is noted the rectifier is in certain embodiments a SCR controller or other device used to produce DC power at variable speeds or frequency and set-ups. Specific arrangements being dependent upon an end user's implementations.

The autotransformer of the present application further includes series reactance L1 included in the three phase AC input power supply or source so as to further attenuate high frequency harmonic currents that may be associated with a multi-pulse AC to DC converter. L1 is a three phase inductor that is applied to the inputs H1, H2, H3 of FIG. 8.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. An autotransformer for converting three-phase AC power to nine-phase AC power comprising:
    a first coil including six windings;
    a second coil including six windings;
    a third coil including six windings, wherein each of the first coil, the second coil, and the third coil have serial windings and non-serial windings;
    the serial windings and non-serial windings being magnetically coupled to each other;
    the serial windings and the non-serial windings on the first coil, the second coil and the third coil containing a start end and a finish end arranged such that current entering the start end produces a magnetic flux in one direction whereas a current entering the finish end produces a magnetic flux in an opposite direction;
    interconnection of the windings including a finish end of a serial winding of the third coil being connected to a finish end of a non-serial winding of the first coil, a start end of the non-serial winding of the first coil being connected to a start end of a non-serial winding of the third coil, a finish end of the non-serial winding of the third coil being connected to a finish end of a non-serial winding of the first coil, a start end of the non-serial winding of the first coil being connected to a start of a series of windings on the second coil, wherein the interconnections of the windings are repeated sequentially for all remaining windings associated with the coils until all windings are interconnected to form a multi-sided polygon;
    symmetrically disposed nodes of the polygon winding which provide points for applying a three-phase AC input voltage; and
    extraction points to extract AC output voltages of a predetermined amplitude and phase.

2. The autotransformer of claim 1 wherein the input voltage is a three-phase AC input and the output is a nine-phase AC output with voltages nominally equal in amplitude and typically spaced by 40° at the output.

3. The autotransformer of claim 1 further including an isolated winding arrangement configured and arranged to provide isolated three phase AC input power to the multi-sided polygon winding arrangement to convert the autotransformer to a double-wound transformer.

4. The autotransformer of claim 3 wherein the isolated winding arrangement is configured as one of a delta input, a wye input, a zig-zag input or an extended delta input.

5. The autotransformer of claim 3 wherein a specific amplitude AC output voltage may be less than, greater than or equal to that of the three-phase AC supply.

6. The autotransformer of claim 1 wherein a nine-phase output is connected to a nine-phase rectifier to produce an 18-pulse converter with low output voltage ripple on the DC voltage and with low harmonic distortion of the AC input harmonic current.

7. The autotransformer of claim 6 wherein the nine phase rectifier is a silicon controlled rectifier (SCR) controller.

8. The autotransformer of claim 6 wherein the nine phase rectifier is configured to produce DC power at least one of variable speeds, frequency and set-ups.

9. The autotransformer of claim 6 wherein a series reactance is included in the three phase AC input power source to further attenuate high frequency harmonic.

10. An autotransformer for converting three-phase AC power to nine-phase AC power comprising:
a first coil including six windings;
a second coil including six windings;
a third coil including six windings, wherein each of the first coil, the second coil, and the third coil have serial windings and non-serial windings;
the serial windings and non-serial windings being magnetically coupled to each other;
the serial windings and the non-serial windings of the first coil, the second coil and the third coil containing a start end and a finish end arranged such that current entering the start end produces a magnetic flux in one direction whereas a current entering the finish end produces a magnetic flux in an opposite direction; and
interconnections of the windings being repeated for all the windings associated with the coils until all windings are interconnected to form a multi-sided polygon, wherein symmetrically disposed nodes provide points for applying three-phase AC input voltage and extracting AC output voltages of a predetermined amplitude and phase, and wherein each phase of the three-phase AC input voltage has six of the windings associated therewith, the six windings associated with each phase not being identical to the six windings associated with each of the coils.

11. The autotransformer of claim 10 wherein the input voltage is a three-phase AC input and the output is a nine-phase AC output with voltages nominally equal in amplitude and typically spaced by 40° at the output.

12. The autotransformer of claim 10 further including an isolated winding arrangement configured and arranged to provide isolated three phase AC input power to the multi-sided polygon winding arrangement to convert the autotransformer to a double-wound transformer.

13. The autotransformer of claim 12 wherein the isolated winding arrangement is configured as one of a delta input, a wye input, a zig-zag input or an extended delta input.

14. The autotransformer of claim 12 wherein a specific amplitude AC output voltage may be less than, greater than or equal to that of the three-phase AC supply.

15. The autotransformer of claim 10 wherein a nine-phase output is connected to a nine-phase rectifier to produce an 18-pulse converter with low output voltage ripple on the DC voltage and with low harmonic distortion of the AC input harmonic current.

16. The autotransformer of claim 15 wherein the nine phase rectifier is a silicon controlled rectifier (SCR) controller.

17. The autotransformer of claim 15 wherein the nine phase rectifier is configured to produce DC power at least one of variable speeds, frequency and set-ups.

18. The autotransformer of claim 15 wherein a series reactance is included in the three phase AC input power source to further attenuate high frequency harmonic.

* * * * *